July 15, 1941.  B. E. SHAW  2,249,258
VALVE STRUCTURE
Filed Aug. 22, 1938
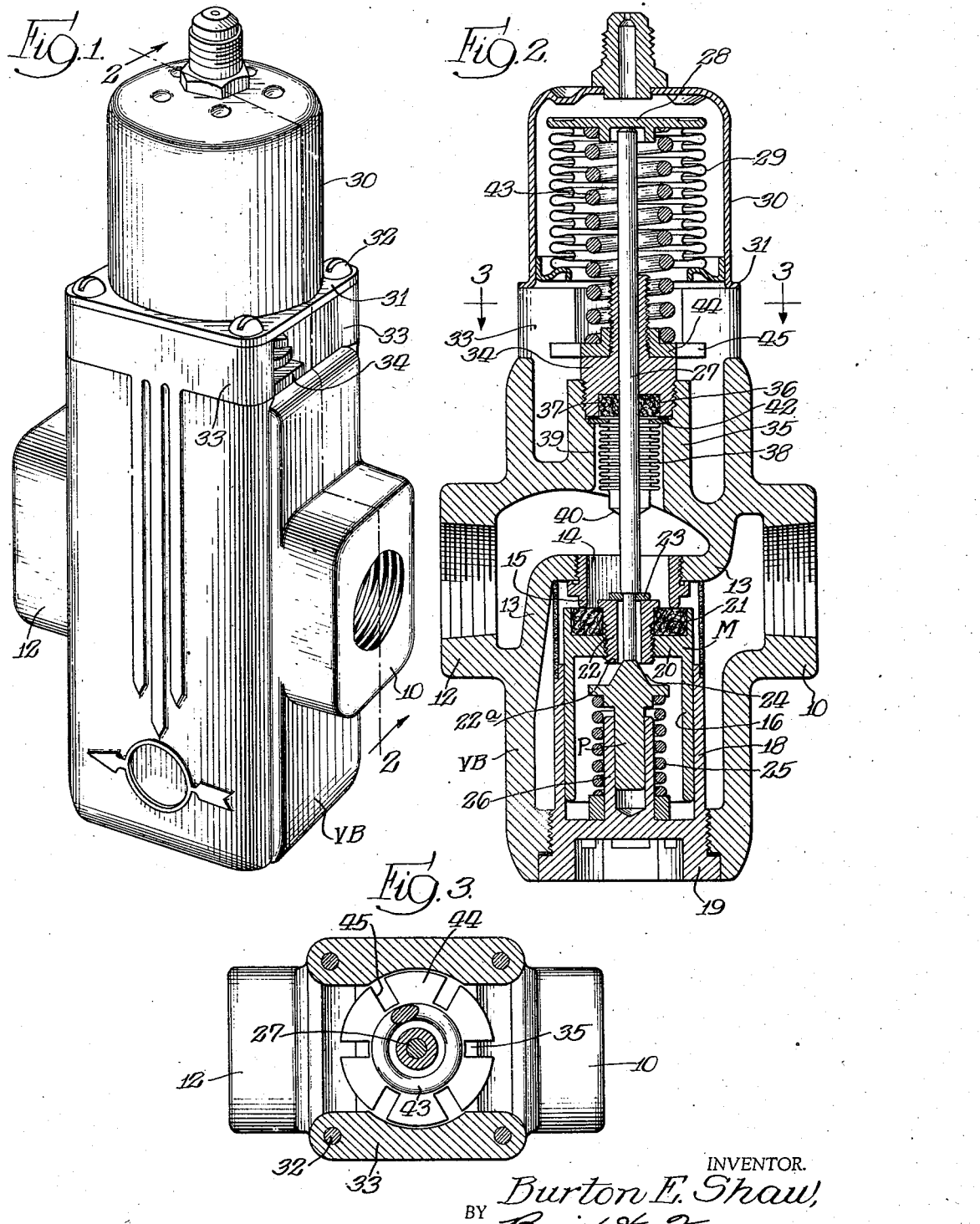
INVENTOR.
Burton E. Shaw,
BY Bair & Freeman
ATTORNEYS.

Patented July 15, 1941

2,249,258

UNITED STATES PATENT OFFICE 2,249,258

VALVE STRUCTURE

Burton E. Shaw, Bristol, Ind., assignor to Penn Electric Switch Co., Goshen, Ind., a corporation of Iowa Application August 22, 1938, Serial No. 226,133

1 Claim. (Cl. 137—156)

An object of my present invention is to provide a valve structure, such as one particularly adapted for controlling the flow of water or other fluid in response to a condition-responsive element such as a pressure actuated bellows.

A further object is to provide a modulating type of valve structure in which there is a main valve and a pilot valve, the pilot valve being directly operated by the condition-responsive means and the main valve being indirectly operated thereby normally by opening of the pilot valve to permit the fluid pressure in the valve body to open the main valve, the pilot valve opening mechanism having means associated therewith to positively open the main valve in response to the condition-responsive means if the main valve is stuck against its seat so tightly that the fluid pressure in the valve cannot open it.

A further object is to provide a water valve structure or the like in which the usual bracket between the valve body and the bellows casing is eliminated and a pair of spaced projections are formed directly on the valve body itself on which the bellows casing is mounted, adjusting means for the bellows being located in the space between the projections and operable by a tool thrust into this space to coact with an adjusting nut therein.

A still further object is to provide a valve structure in which the operating stem is slidably carried by a single elongated bearing and coacts at its ends with a bellows head and a pilot valve respectively in such manner that all possibility of binding is eliminated and the differential of operation of the valve is thereby brought down as close to minimum as possible.

Still another object is to provide a means for lubricating the valve stem and a sealing bellows for preventing leakage around the valve stem, the sealing bellows being so countersunk in the valve body that it is out of the flow of fluid through the valve body.

With the above and other objects and advantages in view, my invention resides more particularly in the novel combination, formation and arrangement of parts hereinafter described and pointed out with particularity in the appended claim.

With respect to the drawing:

Figure 1 is a perspective view of a valve structure embodying my invention;

Figure 2 is a vertical sectional view thereof on the line 2—2 of Figure 1, and

Figure 3 is a horizontal sectional view on the line 3—3 of Figure 2.

I have used the reference character VB to indicate generally a valve body. The valve body VB has an inlet port 10 and an outlet port 12. Between the ports 10 and 12 a partition 13 is located. It is provided with a central opening which receives a sleeve 14 having a valve seat 15 surrounding the bore in the valve.

A main valve M is provided in the form of a cylinder 16 slidably mounted in a cylinder 18. The cylinder 18 is carried by a closure nut 19 screwed into the base of the valve body VB.

The cylinder 16 has a partition 20 on which is located a composition washer 21 to seat against the valve seat 15. A metallic sleeve 22 retains the washer 21 in position and is threaded into the partition 20 of the main valve M. The lower end of the bore of the sleeve 22, as indicated at 22a, constitutes a pilot valve seat.

A pilot valve P is adapted for engagement with the seat 22a. The pilot valve has a cone-shaped head 24 to coact with the seat (the pilot valve being shown in open position in Figure 2.)

The pilot valve P is normally seated by a spring 25 surrounding a sleeve 26. The sleeve 26 is part of the closure nut 19 and slidably receives the pilot valve P.

For opening the pilot valve P, I provide a stem 27. Its lower end engages a flat upper end surface of the pilot valve and its upper end engages a flat lower surface of a head 28 of a bellows 29. A shoulder or projection is provided on the stem 27, such as illustrated by the washer 23, for engaging at times the sleeve 22 for positively opening the main valve M, as will hereinafter be more fully described.

The bellows 29 is sealed in a bellows casing 30. The casing 30 has a flange 31 secured as by screws 32 to a pair of spaced projections 33. The projections 33 are formed on the valve body VB and eliminate the necessity of the usual procedure of providing a bracket for connecting the bellows casing to the valve body. The stem 27 is slidably carried in a bearing sleeve 34. The bearing sleeve 34 is provided with a socket 36 for receiving a lubricant saturated washer 37 of felt or the like for lubricating the valve stem.

For sealing the stem 27 relative to the valve body, I provide a sealing bellows 38. It is sunk in a socket 39 of the valve body so that it is countersunk out of the flow of fluid through the valve body. Accordingly I eliminate the possibility of sediment or the like settling on the sealing bellows and interfering with its action. The lower end of the bellows 38 is sealed as by soldering or brazing 40 to the stem 27 and its upper end is connected to a washer 42 confined in position by the bearing sleeve 34 and a suitable gasket.

The range of operation of the bellows 29 is adjustable by a spring 43. The spring 43 is interposed between the head 28 and an adjusting nut 44. The nut 44 has notches 45 into which a tool, such as a screwdriver, may be inserted for rotating the nut and thereby adjusting the tension of the spring 43. The tool is insertible into the space between the projections 33, which will be obvious from an inspection of Figure 3.

A valve of the foregoing described type has a number of advantages. When valves of this character are used for controlling flow of condenser water in a refrigerating system, the bellows casing 30 is connected with the refrigerant line so that the water valve is open only when the refrigerant compressor is in operation. There are many installations where the valves remain closed for an extended period of time, as during the winter, and there is a possibility of sediment or rust collecting around the main valve seat 15 causing it to stick so that the water pressure will not open it when the pilot valve is opened. By providing means on the stem 27 to engage the main valve and positively open it, the pressure operating upon the bellows 29 can aid the water pressure in breaking the main valve away from its seat and opening it. Thereafter, the main valve will operate properly in a modulated fashion, depending upon the degree of opening of the pilot valve which, in turn, is responsive to the pressure on the bellows 29.

By forming the projections 33 on the valve body itself, I eliminate the necessity of an intermediate bracket, yet provide for ready accessibility to the adjusting nut 44 to change the range of operation of the valve when desired. The use of a single bearing sleeve 34 eliminates all necessity of aligning spaced bearings for the stem 27 and this sleeve, in combination with operative connections at the ends of the stem which permit some lateral movement, insures that all binding action is eliminated so that the valve can operate on a very close differential.

The washer 37 effectively lubricates the stem 27 and at the same time is sealed against collecting dust and the like from the external atmosphere. It is also sealed by the bellows 38 against the water flowing through the valve coming in contact with the washer. The socket 39 permits a countersunk mounting of the sealing bellows 38 so that it is in a pocket of non-circulating fluid and thus out of the flow of the fluid which might bring sediment or other deposits to the bellows and interfere with its free action.

By the use of the sleeve 22 and the pilot valve P, both of metal, and the pilot valve having a cone-shaped portion 24, I provide a very sensitive and accurate pilot valve which produces the desired degree of modulation of the main valve within very close limits.

While I have shown and described a preferred embodiment of my water valve, it will be readily appreciated that various changes and modifications of structures may be employed to meet different conditions in use and manufacture without, however, departing in any manner from the spirit of my invention as defined by the appended claim.

What I claim as new and desire to secure by Letters Patent of the United States is:

For use with a valve structure having a valve body and valve mechanism therein; means to operate said valve mechanism comprising a bellows exterior of said valve body, a pressure connection with said bellows whereby a predetermined pressure affecting said bellows will operate said valve mechanism, said valve body having a boss surrounded by a tubular portion of the valve body, two sides of which form projections spaced from each other and extending upwardly from said tubular portion, said bellows being mounted on said projections, a guide sleeve surrounding said stem and mounted in said boss, said sleeve having a screw threaded part located between said projections, and an adjusting nut for said bellows located on said threaded part and accessible for adjustment by a tool inserted between said projections.

BURTON E. SHAW.